United States Patent
Choe et al.

(10) Patent No.: US 11,419,153 B2
(45) Date of Patent: Aug. 16, 2022

(54) METHOD AND APPARATUS FOR EARLY DATA TRANSMISSION

(71) Applicant: LG Electronics Inc., Seoul (KR)

(72) Inventors: Hyunjung Choe, Seoul (KR); Youngdae Lee, Seoul (KR); Gyeongcheol Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/960,800

(22) PCT Filed: Feb. 13, 2019

(86) PCT No.: PCT/KR2019/001727
§ 371 (c)(1),
(2) Date: Jul. 8, 2020

(87) PCT Pub. No.: WO2019/160311
PCT Pub. Date: Aug. 22, 2019

(65) Prior Publication Data
US 2021/0058972 A1    Feb. 25, 2021

Related U.S. Application Data

(60) Provisional application No. 62/630,839, filed on Feb. 15, 2018.

(51) Int. Cl.
*H04W 4/00*      (2018.01)
*H04W 74/08*     (2009.01)
*H04W 12/106*    (2021.01)
*H04W 72/04*     (2009.01)

(52) U.S. Cl.
CPC ..... *H04W 74/0833* (2013.01); *H04W 12/106* (2021.01); *H04W 72/04* (2013.01)

(58) Field of Classification Search
CPC .......... H04J 2203/0069; H04W 72/04; H04W 72/12
See application file for complete search history.

(56) References Cited

U.S. PATENT DOCUMENTS

2010/0150114 A1* 6/2010 Che ................. H04L 1/0026
                                                   370/336
2019/0215686 A1* 7/2019 Malkamaki ............ H04W 8/08
2020/0374934 A1* 11/2020 Koskinen .......... H04W 74/0833

OTHER PUBLICATIONS

Ericsson, "Early data transmission for MTC," R1-1719350, 3GPP TSG-RAN WG1 Meeting #91, Reno, Nevada, USA, dated Nov. 27-Dec. 1, 2017, 6 pages.

(Continued)

*Primary Examiner* — Shantell L Heiber
(74) *Attorney, Agent, or Firm* — Fish & Richardson P.C.

(57) ABSTRACT

Provided are a method for transmitting a message by a user equipment (UE) in a wireless communication, and an apparatus supporting the same. The method may include: initiating early data transmission; receiving a random access response message including an uplink grant, from a base station (BS); based on the uplink grant, determining whether or not to transmit a first message related to the early data transmission to the BS, in response to the random access response message; and after determining to transmit the first message related to the early data transmission, resuming radio bearers for the early data transmission.

15 Claims, 18 Drawing Sheets

(56) References Cited

OTHER PUBLICATIONS

Ericsson, "Remaining Issues in Early Data Transmission over NAS," R2-1713056, 3GPP TSG-RAN WG2 #100, Reno, Nevada, USA, dated Nov. 27-Dec. 1, 2017, 9 pages.
Huawei, HiSilicon, Neul, "RACH procedure in early data transmission," R2-1713191, 3GPP TSG RAN WG2 Meeting #100, Reno, USA, dated Nov. 27-Dec. 1, 2017, 5 pages.
Intel Corporation, "Early data transmission discussion for eFeMTC and FeNBIoT," R2-1712639, 3GPP TSG RAN WG2 Meeting #100, Reno, USA, dated Nov. 27-Dec. 1, 2017, 6 pages.
Qualcomm Incorporated, "UL early data transmission," R2-1708239, 3GPP TSG-RAN WG2Meeting #99, Berlin, Germany, dated Aug. 21-25, 2017, 15 pages.

\* cited by examiner

METHOD AND APPARATUS FOR EARLY
DATA TRANSMISSION

CROSS-REFERENCE TO RELATED APPLICATIONS

This application is a National Stage application under 35 U.S.C. § 371 of International Application No. PCT/KR2019/001727, filed on Feb. 13, 2019, which claims the benefit of Korean Patent Application No. 62/630,839, filed on Feb. 15, 2018. The disclosures of the prior applications are incorporated by reference in their entirety.

BACKGROUND OF THE DISCLOSURE

Field of the disclosure

The present invention relates to a wireless communication system, and more particularly, to a method for performing an early data transmission in a wireless communication system and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE DISCLOSURE

Technical Objects

Meanwhile, in early data transmission for user plane (UP) solution, the UE may resume radio bearers, restore previously received security context, re-establish low layers, etc. before the UE starts data transmission. If early data transmission fails due to the small grant, however, the UE shall restore everything. Therefore, a time point that the UE resumes and applies contexts for early data transmission is also important.

Technical Solutions

One embodiment provides a method for transmitting a message by a user equipment (UE) in a wireless communication. The method may include: initiating early data transmission; receiving a random access response message including an uplink grant, from a base station (BS); based on the uplink grant, determining whether or not to transmit a first message related to the early data transmission to the BS, in response to the random access response message; and after determining to transmit the first message related to the early data transmission, resuming radio bearers for the early data transmission.

Another embodiment provides a user equipment (UE) transmitting a message in a wireless communication. The UE may include: a transceiver; at least one processor; and at least one computer memory operably connectable to the at least one processor and storing instructions that, when executed, cause the at least one processor to perform operations comprising: initiating early data transmission; receiving a random access response message including an uplink grant, from a base station (BS); based on the uplink grant, determining whether or not to transmit a first message related to the early data transmission to the BS, in response to the random access response message; and after determining to transmit the first message related to the early data transmission, resuming radio bearers for the early data transmission.

Another embodiment provides a method for receiving a message by a base station (BS) in a wireless communication. The method may include: after early data transmission is initiated, transmitting a random access response message including an uplink grant, to a user equipment (UE); and when the UE determines to transmit a first message related to the early data transmission based on the uplink grant, receiving the first message related to the early data transmission from the UE in response to the random access response message, wherein radio bearers for the early data transmission are resumed after the UE determines to transmit the first message related to the early data transmission.

Effects of the Disclosure

It is possible to prevent the UE from unnecessary procedure.

DESCRIPTION OF EXEMPLARY EMBODIMENTS

In this document, the term "I" and "," should be interpreted to indicate "and/or." For instance, the expression "A/B" may mean "A and/or B." Further, "A, B" may mean "A and/or B." Further, "AB/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
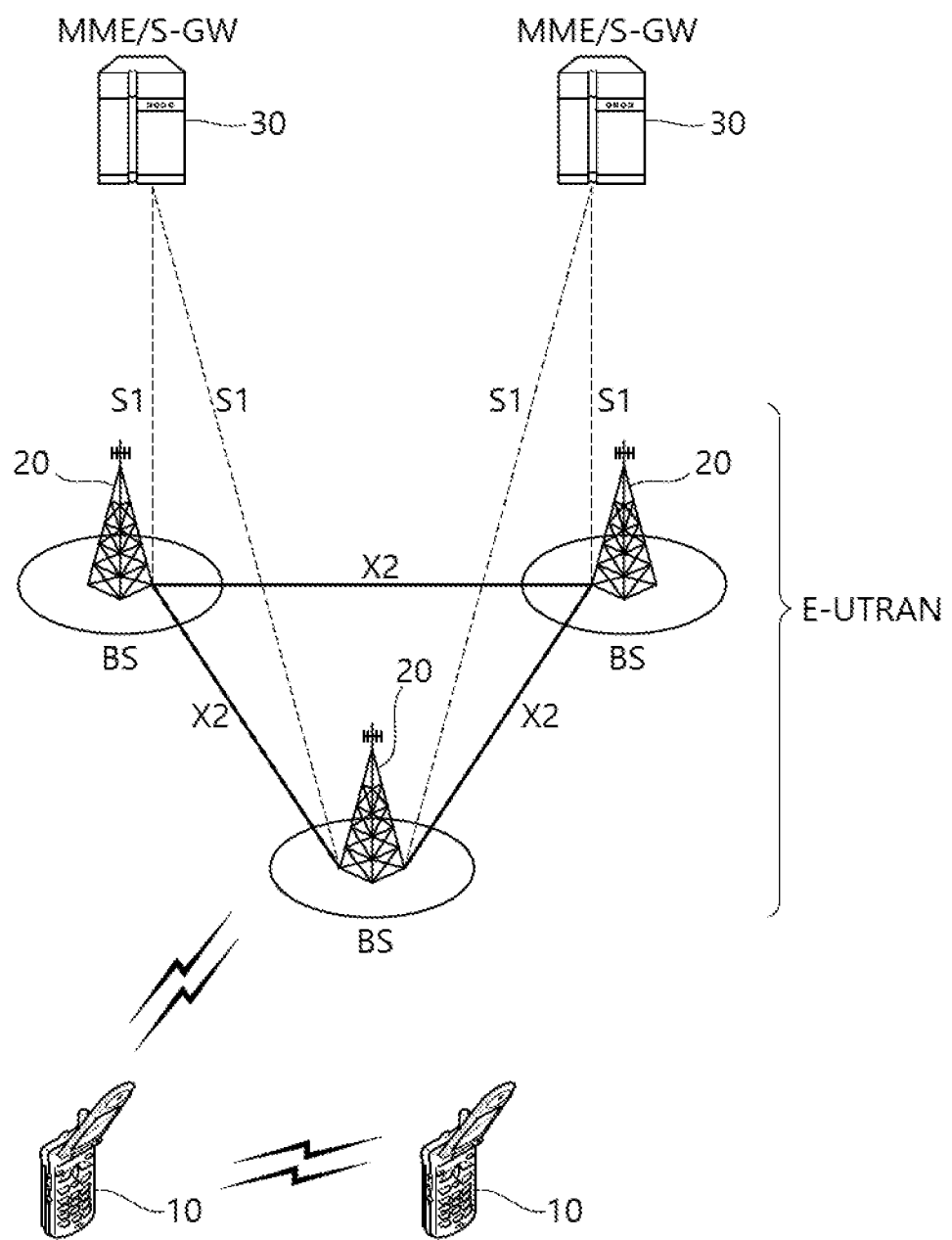
FIG. 1 shows an example of a wireless communication system to which technical features of the present invention may be applied.

FIG. 1 shows an example of a wireless communication system to which technical features of the present invention may be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
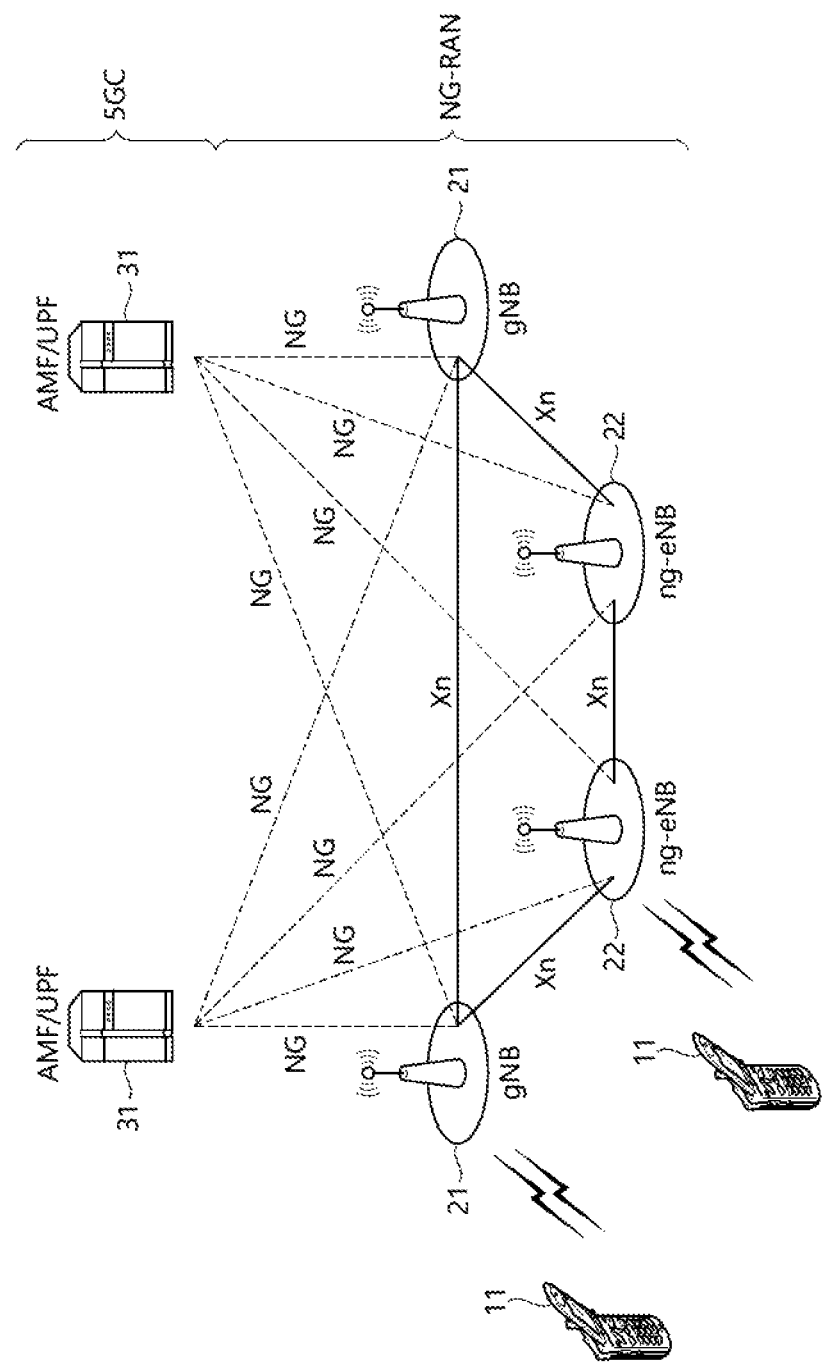
FIG. 2 shows another example of a wireless communication system to which technical features of the present invention may be applied.

FIG. 2 shows another example of a wireless communication system to which technical features of the present invention may be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MIME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
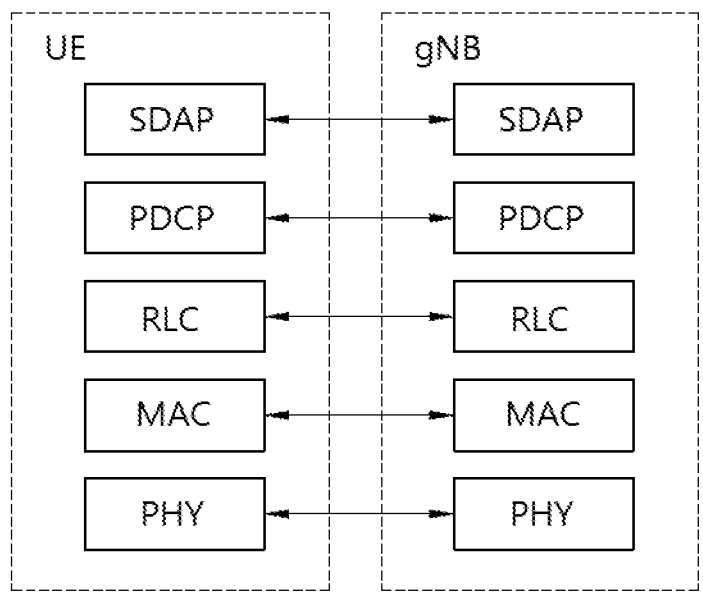
FIG. 3 shows a block diagram of a user plane protocol stack to which technical features of the present invention may be applied.
Figure 4:
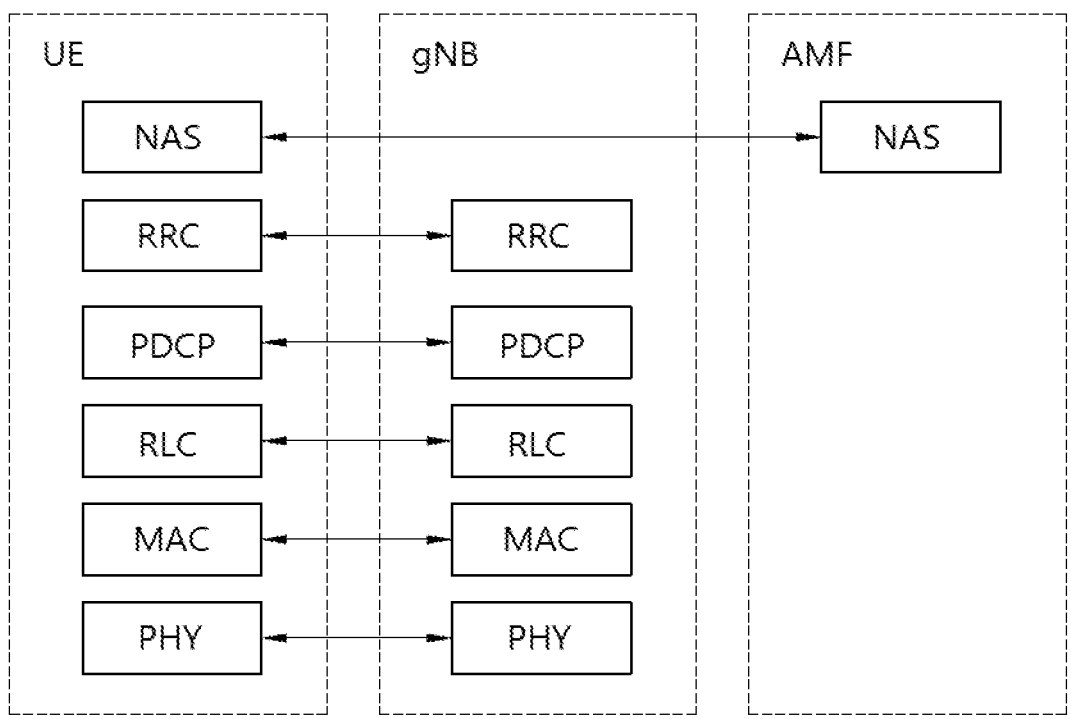
FIG. 4 shows a block diagram of a control plane protocol stack to which technical features of the present invention may be applied.

FIG. 3 shows a block diagram of a user plane protocol stack to which technical features of the present invention may be applied. FIG. 4 shows a block diagram of a control plane protocol stack to which technical features of the present invention may be applied. The user/control plane protocol stacks shown in FIG. 3 and FIG. 4 are used in NR. However, user/control plane protocol stacks shown in FIG. 3 and FIG .4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, a random access procedure will be described.

Figure 5:
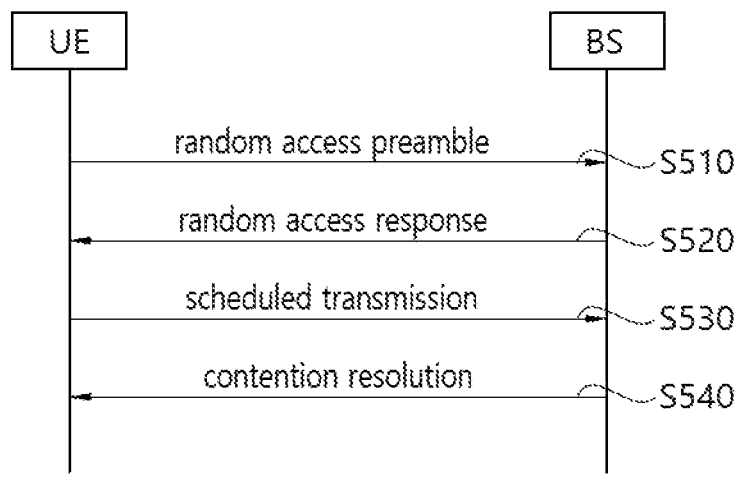
FIG. 5 shows a contention-based random access procedure to which technical features of the present invention may be applied.

FIG. 5 shows a contention-based random access procedure to which technical features of the present invention may be applied.

Referring to FIG. 5, a UE randomly selects one random access preamble from a random access preamble set indicated by system information or a handover command. The UE selects a radio resource for transmitting the random access preamble to transmit the selected random access preamble (S510). The radio resource may be a specific subframe, and selecting the radio resource may be selecting a physical random access channel (PRACH).

After transmitting the random access preamble, the UE attempts to receive a random access response within a random access response reception window indicated by the system information or the handover command and accordingly receives a random access response (S520). The random access response may be transmitted in an MAC PDU format, and the MAC PDU may be forwarded via a physical downlink shared channel (PDSCH). Further, a physical downlink control channel (PDCCH) is also forwarded so that the UE properly receives information forwarded via the PDSCH. That is, the PDCCH includes information on the UE receiving the PDSCH, frequency and time information on a radio resource for the PDSCH, and a transmission format for the PDSCH. Once successfully receiving the PDCCH forwarded to the UE, the UE properly receives the random access response transmitted via the PDSCH based on the information in the PDCCH.

The random access response may include a random access preamble identifier (ID), an uplink radio resource (UL grant), a temporary cell-radio network temporary identifier (C-RNTI), and a time alignment command (TAC). Since one random access response may include random access response information for one or more UEs, a random access preamble ID may be included to indicate a UE for which a UL grant, a temporary C-RNTI, and a TAC are valid. The random access preamble ID may be an ID of the random access preamble received by a BS. The TAC may be included as information for the UE to adjust uplink synchronization. The random access response may be indicated by a random access ID on the PDCCH, that is, a random access-radio network temporary identifier (RA-RNTI).

When the UE receives the random access response valid therefor, the UE processes information included in the random access response and performs scheduled transmission to the BS (S530). That is, the UE applies the TAC and stores the temporary C-RNTI. Further, the UE transmits data stored in a buffer of the UE or newly generated data to the BS using the UL grant. In this case, information to identify the UE needs to be included, which is for identifying the UE in order to avoid a collision since the BS does not determine which UEs perform random access in a contention-based random access process.

There are two methods for including information for identifying a UE. When the UE has a valid cell ID already allocated by a corresponding cell before performing random access, the UE transmits the cell ID thereof through the UL grant. However, when the UE is not allocated a valid cell ID before the random access process, the UE transmits a unique ID thereof (e.g., S-TMSI or random ID). Generally, the unique ID is longer than the cell ID. When the UE transmits the data via the UL grant, the UE starts a contention resolution timer.

After transmitting the data including the ID of the UE through the UL grant allocated by receiving the random access response, the UE waits for an instruction from the BS to avoid a collision (S540). That is, the UE attempts to receive the PDCCH in order to receive a specific message. There are two proposed methods for receiving a PDCCH. As described above, when the ID of the UE transmitted via the UL grant is a cell ID, the UE may attempt to receive the PDCCH using the cell ID of the UE. In this case, when the UE receives the PDCCH through the cell ID of the UE before the contention resolution timer expires, the UE determines that random access has been normally performed and terminates random access. When the ID transmitted via the UL grant is the unique ID, the UE may attempt to receive the PDCCH using the temporary C-RNTI included in the random access response. In this case, when the UE receives the PDCCH through the temporary cell ID before the contention resolution timer expires, the UE identifies data forwarded by the PDSCH indicated by the PDCCH. When the data includes the unique ID of the UE, the UE may determine that random access has been normally performed and may terminate random access.

Figure 6:
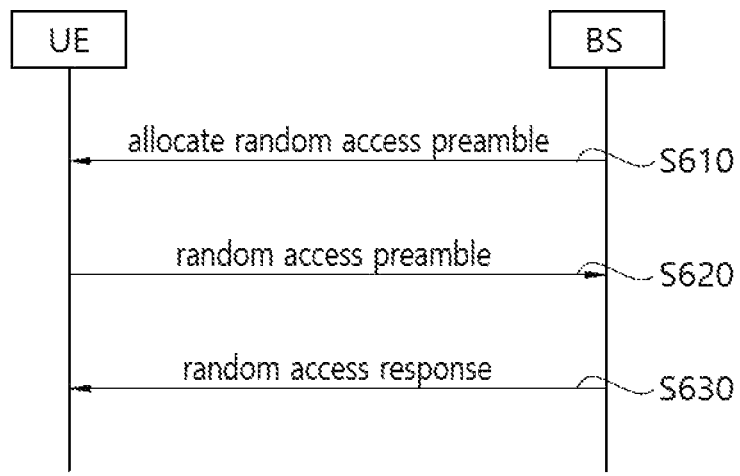
FIG. 6 shows a non-contention random access procedure to which technical features of the present invention may be applied.

FIG. 6 shows a non-contention random access procedure to which technical features of the present invention may be applied.

Unlike contention-based random access, non-contention random access may be terminated when a UE receives a random access response.

Non-contention random access may be initiated by a request, such as a handover and/or a command from a BS. Here, in these two cases, contention-based random access may also be performed.

The UE is allocated by the BS a designated random access preamble having no possibility of a collision. The random access preamble may be allocated through a handover command and a PDCCH command (S610).

After being allocated the random access preamble designated for the UE, the UE transmits the random access preamble to the BS (S620).

Upon receiving the random access preamble, the BS transmits a random access response to the UE in response (S630). A procedure associated with the random access response has been mentioned above in S520 of FIG. 5.

Hereinafter, security will be described.

Figure 7:
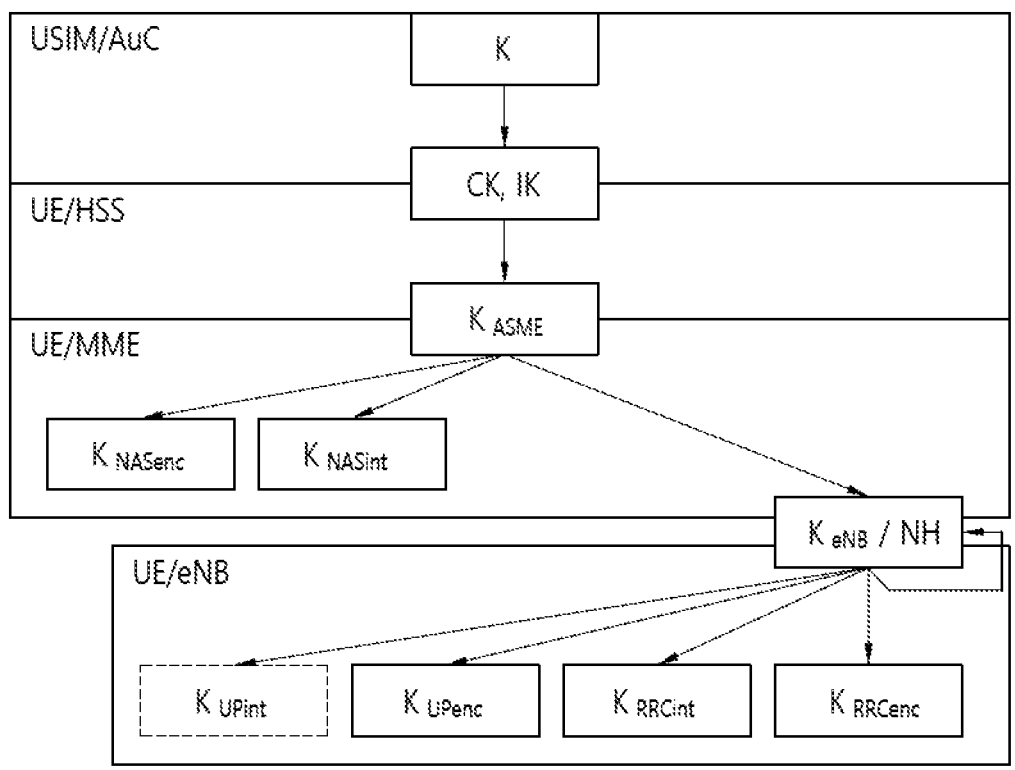
FIG. 7 shows a general procedure of generating a security key to which technical features of the present invention may be applied.

FIG. 7 shows a general procedure of generating a security key to which technical features of the present invention may be applied.

Referring to FIG. 7, the MME initiates an authentication and key agreement (AKA) procedure by requesting a home environment (HE) of authentication vectors. The HE responds to the MME through an authentication vector that includes a base key $K_{ASME}$. Accordingly, as a result of the AKA procedure, the EPC and the UE may share the base key $K_{ASME}$. NAS keys and parameters such as $K_{eNB}$ and NH (Next Hop) are generated from the base key $K_{ASME}$. Although the base key $K_{ASME}$ is not transferred to an entity outside the EPC, if the UE is shifted to the ECM-CONNECTED mode, the $K_{eNB}$ and NH may be transferred from the EPC to the eNB. The eNB and the UE may generate user plain (UP) keys and RRC keys from the parameter $K_{eNB}$. The UP keys and RRC keys may be updated during handover.

$K_{eNB*}$ may be generated by the UE and the source eNB from one of both a combination of target PCI (Physical Cell ID), target frequency and $K_{eNB}$ and a combination of target PCI, target frequency and NH. Afterwards, $K_{eNB*}$ refers to new $K_{eNB}$ used for RRC and UP traffic in a target cell. If the UE is shifted to the ECM-IDLE mode, all the keys are deleted from the eNB.

Security of the AS layer includes RRC signaling in the SRB and ciphering of user data in the DRB together with integrity protection for RRC signaling in the SRB. The RRC layer controls security configuration which is a part of AS configuration. In this case, the security configuration includes two parameters such as 'keyChangeIndicator' and 'nextHopChainingCount' together with an integrity protection algorithm and a ciphering algorithm. The security configuration is used when the UE determines the AS layer security key during handover and/or RRC connection re-establishment. In the meantime, the integrity protection algorithm is common to SRB1 and SRB2, and the ciphering algorithm is common to all the RBs, i.e., SRB1, SRB2 and DRB.

In more detail, the AS layer uses three different security keys, i.e., a key $K_{RRCint}$ for integrity protection of RRC signaling, a key $K_{RRCenc}$ for ciphering of RRC signaling, and a key $K_{UPenc}$ for ciphering of user data. These security keys are all generated from the parameter $K_{eNB}$. If RRC connection is established, since new AS layer security keys are generated from $K_{eNB}$, a new parameter for generating the keys is not required.

Integrity protection and ciphering of the RRC message for handover are performed by the source eNB on the basis of security configuration which is being used prior to handover. The integrity algorithm and the ciphering algorithm may be changed only after the handover is performed, and four AS layer security keys, i.e., $K_{eNB}$, $K_{RRCint}$, $K_{RRCenc}$ and $K_{UPenc}$ are changed per handover and RRC connection re-establishment.

The parameter 'keyChangeIndicator' is used during handover, and indicates whether the UE use security keys related to the most recent available key $K_{ASME}$. Also, the parameter 'nextHopChainingCount' is used when a new parameter $K_{eNB}$ is generated by the UE during handover and RRC connection re-establishment. An intra cell handover procedure may be used to change the security keys in the RRC connected mode.

In the meantime, if the RRC connected mode is shifted to the RRC idle mode, the eNB deletes security keys of the UE which is the RRC idle mode, and the keys are stored in the MME only. In other words, the eNB and the UE delete NH, $K_{eNB}$, $K_{RRCenc}$, $K_{RRCint}$ and $K_{UPenc}$, but the MME and the UE store $K_{ASME}$, $K_{NASint}$ and $K_{NAsenc}$.

Figure 8:
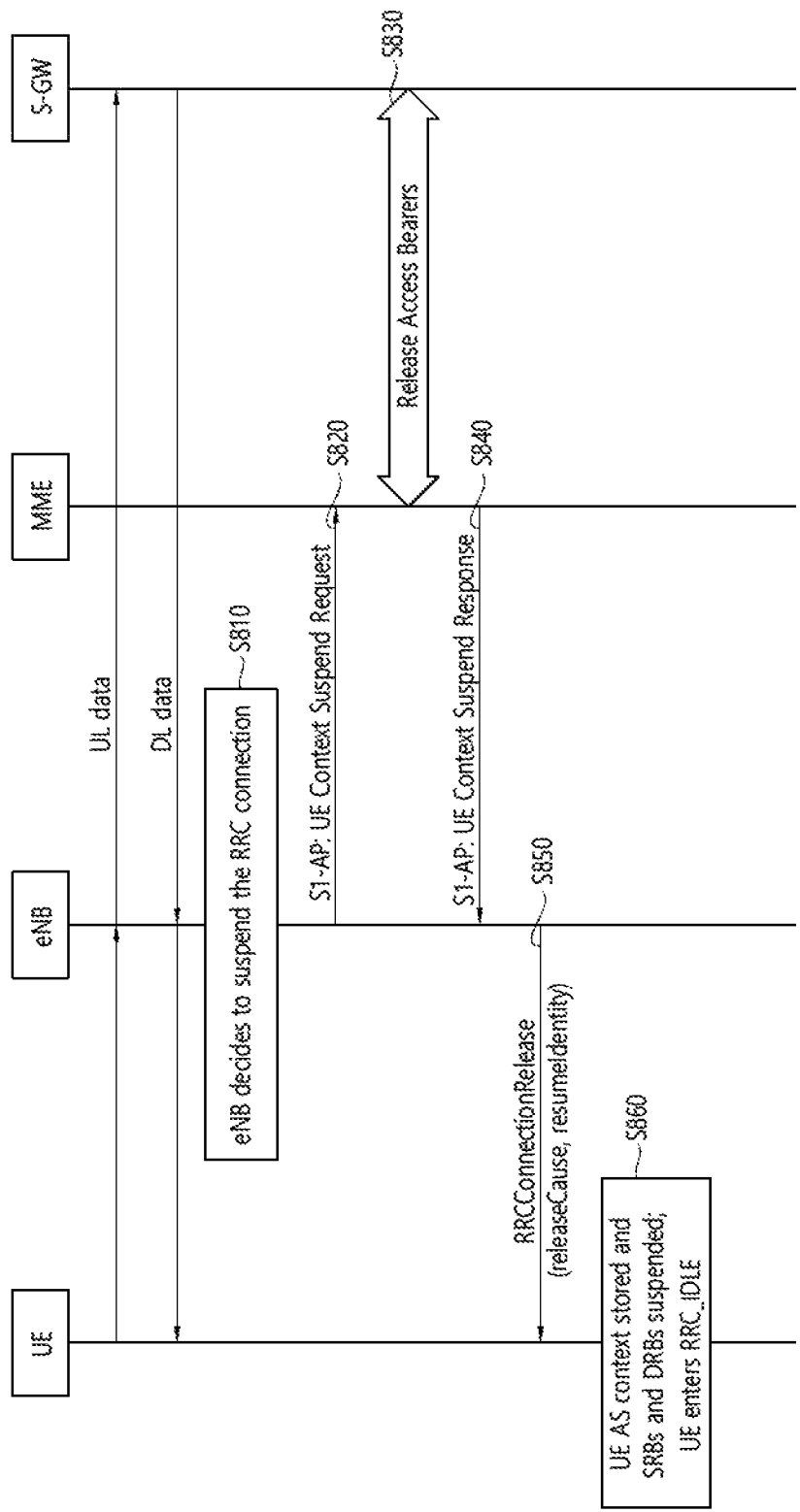
FIG. 8 shows an RRC connection suspend procedure to which technical features of the present invention may be applied.

FIG. 8 shows an RRC connection suspend procedure to which technical features of the present invention may be applied.

Referring to FIG. 8, in step S810, due to some triggers, e.g. the expiry of a UE inactivity timer, the eNB decides to suspend the RRC connection.

In step S820, the eNB initiates the S1-AP UE context suspend procedure to inform the MME that the RRC connection is being suspended.

In step S830, the MME requests the S-GW to release all S1-U bearers for the UE.

In step S840, the MME acks the step S820.

In step S850, the eNB suspends the RRC connection by sending an RRC connection release message with the release cause set to 'rrc-Suspend'. The message includes the resume ID which is stored by the UE.

In step S860, the UE stores the AS context, suspends all SRBs and DRBs, and enters RRC_IDLE.

Figure 9:
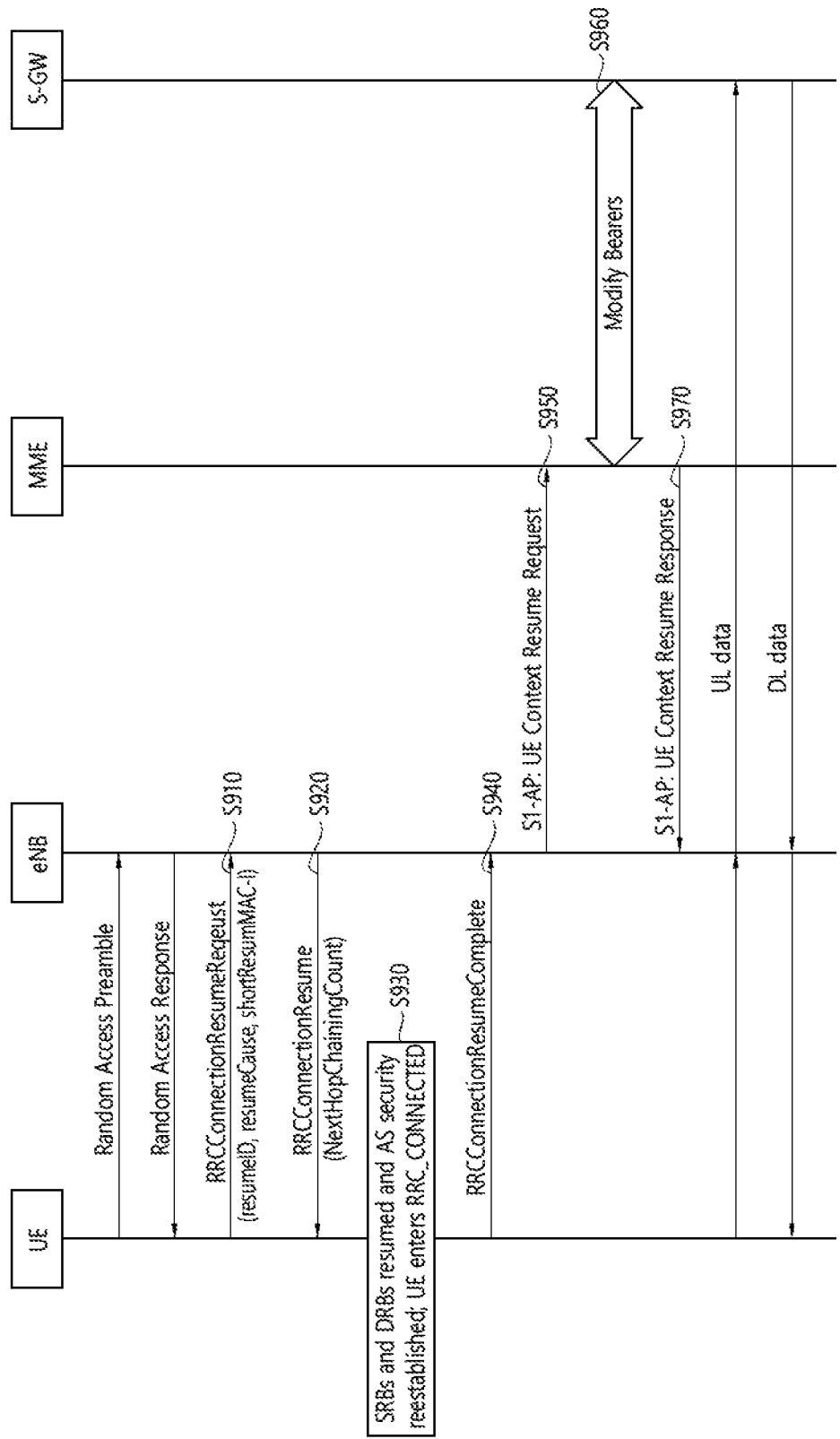
FIG. 9 shows an RRC connection resume procedure to which technical features of the present invention may be applied.

FIG. 9 shows an RRC connection resume procedure to which technical features of the present invention may be applied.

Referring the FIG. 9, in step S910, at some later point in time (e.g. when the UE is being paged or when new data arrives in the uplink buffer), the UE resumes the connection by sending an RRC connection resume request to the eNB. The UE includes its resume ID, the establishment cause, and authentication token. The authentication token is calculated in the same way as the short MAC-I used in RRC connection re-establishment and allows the eNB to verify the UE identity.

In step S920, provided that the resume ID exists and the authentication token is successfully validated, the eNB responds with an RRC connection resume. The message includes the Next Hop Chaining Count (NCC) value which is required in order to re-establish the AS security.

In step S930, the UE resumes all SRBs and DRBs and re-establishes the AS security. The UE is now in RRC_CONNECTED.

In step S940, the UE responds with an RRC connection resume complete confirming that the RRC connection was resumed successfully, along with an uplink buffer status report, and/or UL data, whenever possible, to the eNB.

In step S950, the eNB initiates the S1-AP context resume procedure to notify the MME about the UE state change.

In step S960, the MME requests the S-GW to activate the S1-U bearers for the UE.

In step S970, the MME acks the step S950.

Hereinafter, early data transmission (EDT) will be described.

EDT allows one uplink data transmission optionally followed by one downlink data transmission during the random access procedure.

Figure 10:
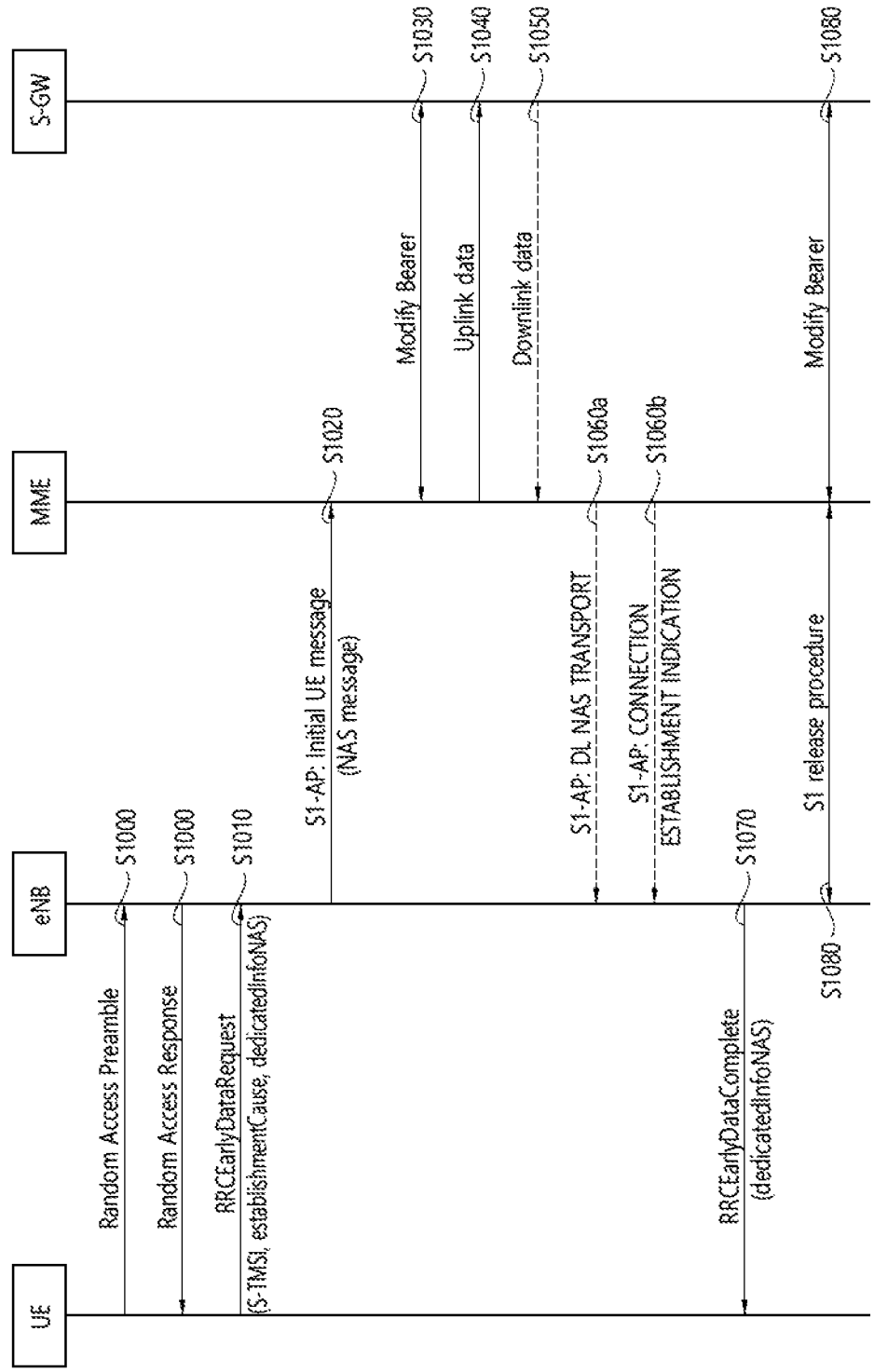
FIG. 10 shows an EDT procedure for user plane CIoT EPS optimizations to which technical features of the present invention may be applied.

FIG. 10 shows an EDT procedure for user plane CIoT EPS optimizations to which technical features of the present invention may be applied.

Referring to FIG. 10, in step S1000, upon connection establishment request for mobile originated (MO) data from the upper layers, the UE initiates the early data transmission procedure and selects a random access preamble configured for EDT.

In step S1010, the UE sends RRC early data request message concatenating the user data on CCCH.

In step S1020, the eNB initiates the S1-AP initial UE message procedure to forward the NAS message and establish the S1 connection. The eNB may indicate in this procedure that this connection is triggered for EDT.

In step S1030, the MME requests the S-GW to re-activate the EPS bearers for the UE.

In step S1040, the MME sends the uplink data to the S-GW.

In step S1050, if downlink data are available, the S-GW sends the downlink data to the MME.

In step S1060a, if downlink data are received from the S-GW, the MME forwards the data to the eNB via DL NAS transport procedure and may also indicate whether further data are expected. Otherwise, in step S1060b, the MME may trigger connection establishment indication procedure and also indicate whether further data are expected.

In step S1070, if no further data are expected, the eNB can send the RRC early data complete message on CCCH to keep the UE in RRC_IDLE. If downlink data were received in step S1060a, they are concatenated in RRC early data complete message.

In step S1080, the S1 connection is released and the EPS bearers are deactivated.

Figure 11:
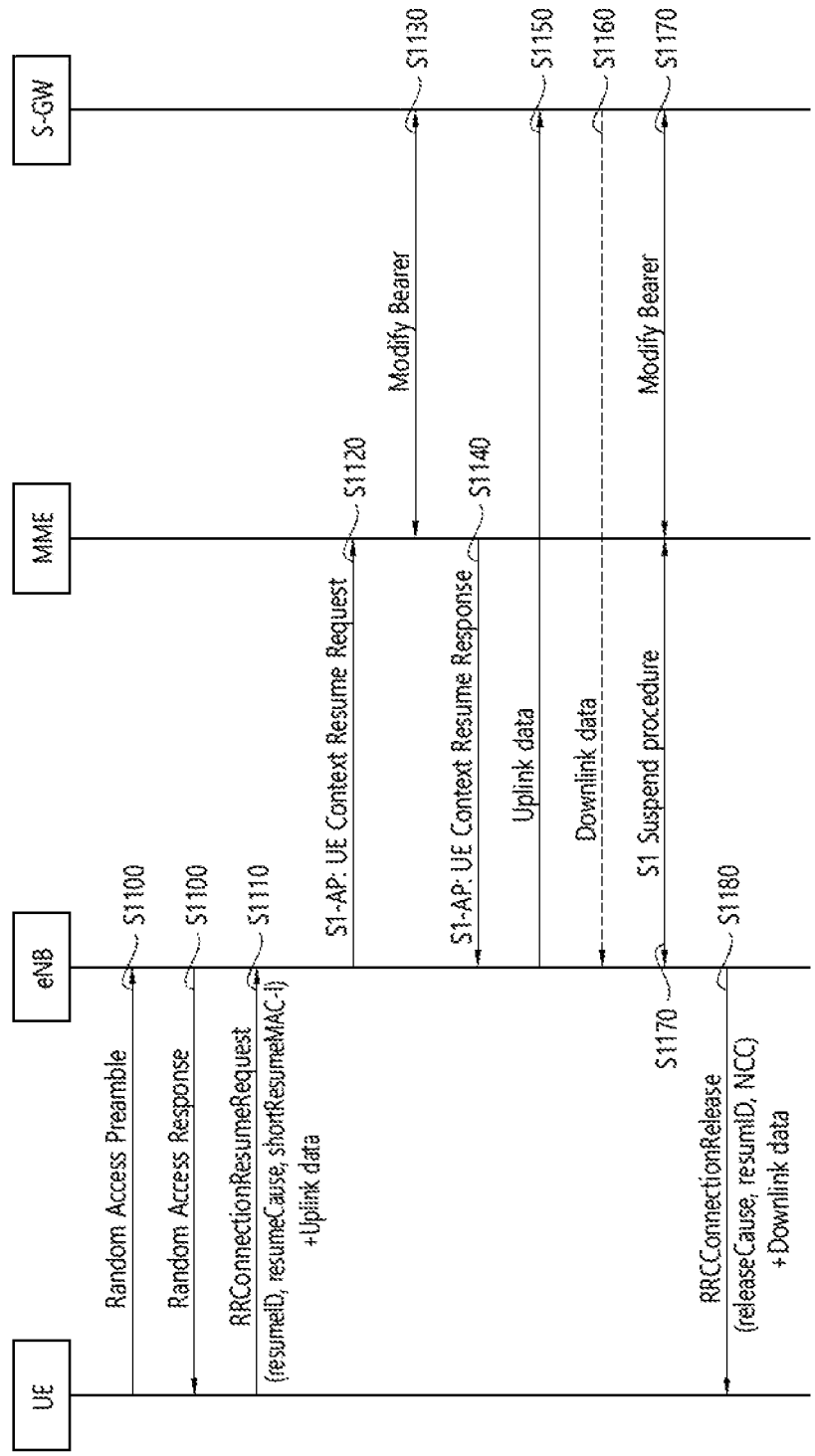
FIG. 11 shows an EDT procedure for control plane CIoT EPS optimizations to which technical features of the present invention may be applied.

FIG. 11 shows an EDT procedure for control plane CIoT EPS optimizations to which technical features of the present invention may be applied.

Referring to FIG. 11, in step S1100, upon connection resumption request for mobile originated (MO) data from the upper layers, the UE initiates the early data transmission procedure and selects a random access preamble configured for EDT.

In step S1110, the UE sends an RRC connection resume request to the eNB, including its resume ID, the establishment cause, and an authentication token. The UE resumes all SRBs and DRBs, derives new security keys using the next hop chaining count provided in the RRC connection release message of the previous connection and re-establishes the AS security. The user data are ciphered and transmitted on DTCH multiplexed with the RRC connection resume request message on CCCH.

In step S1120, the eNB initiates the S1-AP context resume procedure to resume the S1 connection and re-activate the S1-U bearers.

In step S1130, the MME requests the S-GW to re-activate the S1-U bearers for the UE.

In step S1140, the MME confirms the UE context resumption to the eNB.

In step S1150, the uplink data are delivered to the S-GW.

In step S1160, if downlink data are available, the S-GW sends the downlink data to the eNB.

In step S1170, if no further data are expected from the S-GW, the eNB can initiate the suspension of the S1 connection and the deactivation of the S1-U bearers.

In step S1180, the eNB sends the RRC connection release message to keep the UE in RRC_IDLE. The message includes the release cause set to 'rrc-Suspend', the resume ID, the next hop chaining count and drb-ContinueROHC which are stored by the UE. If downlink data were received in step S1160, they are sent ciphered on DTCH multiplexed with the RRC connection release message on DCCH.

In this specification, a RRC connection resume request message may be distinguished into two types. First type of the RRC connection resume request message may be used to request the resumption of a suspended RRC connection. For instance, the first type of the RRC connection resume request message has been described in step S910 of FIG. 9. Second type of the RRC connection resume request message may be used to perform UP-EDT. For instance, the second type of the RRC connection resume request message has been described in step S1110 of FIG. 11. For convenience of explanation, hereinafter, the first type of the RRC connection resume request message may be referred to as a legacy RRC connection resume request message, and the second type of the RRC connection resume request message may be referred to as an RRC connection resume request message for EDT.

Meanwhile, although a UE initiates early data transmission to transmit user data in a message 3 (e.g. RRC connection resume request message for EDT), the UE may need to fallback to a legacy procedure (e.g. legacy RRC resume procedure not for EDT) and send a legacy message 3 (e.g. legacy RRC connection resume request message). For instance, unless the UE receives the enough UL grant for the message 3 for EDT (e.g. RRC connection resume request message for EDT), the UE may need to fallback to the legacy procedure (e.g. legacy RRC resume procedure) and send the legacy message 3 (e.g. legacy RRC connection resume request message). However, according to prior art, an RRC layer of the UE cannot determine whether to fallback to the legacy procedure or not because the RRC layer of the UE cannot know that the UL grant is enough for the message 3 for EDT.

Further, as described above, in early data transmission for user plane (UP) solution, the UE may resume radio bearers, restore previously received security context, re-establish low layers, etc. before the UE starts data transmission. If early data transmission fails due to the small grant, however, the UE shall restore everything. Therefore, a time point that the UE resumes and applies contexts for early data transmission is also important. The UE RRC layer may decide whether or not the UE transmits early data to the network after checking all conditions such as the UL grant.

Thus, a method for performing early data transmission procedure and an apparatus supporting the same need to be suggested according to an embodiment of the present invention.

Figure 12:
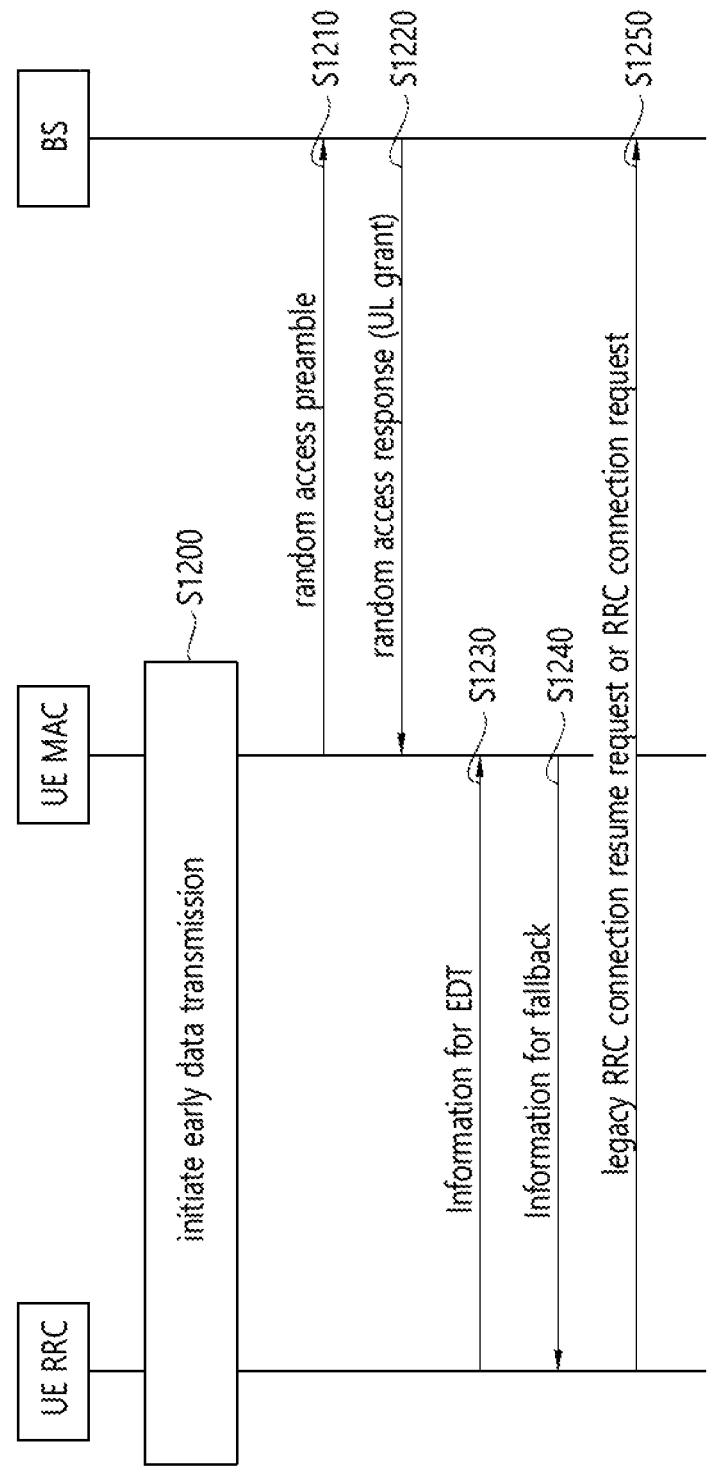
FIG. 12 shows a fallback procedure according to an embodiment of the present invention.

FIG. 12 shows a fallback procedure according to an embodiment of the present invention.

According to an embodiment of the present invention, the UE may initiate early data transmission. After initiating early data transmission, the UE may receive an uplink grant from the BS. Based on the uplink grant, the UE may transmit a first message related to data transmission other than the early data transmission, to the BS. For this, based on the uplink grant, a MAC layer of the UE may inform an RRC layer of the UE to transmit the first message related to the data transmission other than the early data transmission.

The RRC layer of the UE may submit a second message related to the early data transmission to the MAC layer of the UE. The uplink grant may be not enough for the early data transmission. The first message related to the data transmission may be a legacy RRC connection resume request message not for the early data transmission. The second message related to the early data transmission may be an RRC connection resume request message for the early data transmission.

Specifically, referring to FIG. 12, in step S1200, the UE may initiate early data transmission. For instance, the UE may initiate early data transmission when at least one of the following conditions are fulfilled:

For CP-EDT, the upper layers (e.g. NAS layer) request establishment of an RRC connection, the UE supports CP-EDT, and system information block includes cp-EDT.

For UP-EDT, the upper layers (e.g. NAS layer) request resumption of an RRC connection, the UE supports UP-EDT, system information block includes up-EDT, and the UE has a stored value of the next hop chaining count provided in the RRC connection release message with suspend indication during the preceding suspend procedure. The next hop chaining count may be used to update a security key (e.g. $K_{eNB}$ key).

The establishment or resumption request is for mobile originating calls and the establishment cause is MO data or MO exception data or delay tolerant access.

System information block includes edt-Parameters.

The size of the resulting MAC PDU including the total UL data is expected to be smaller than or equal to the TBS signalled in edt-TBS.

Further, for instance, if the UE is initiating UP-EDT, the UE may restore the PDCP state and re-establish PDCP entities for all SRBs and all DRBs. Further, the UE may resume all SRBs and all DRBs, and derive the $K_{eNB}$ key based on the KASME key to which the current $K_{eNB}$ is associated, using the stored value of the next hop chaining count received in the RRC connection release message in the preceding connection. Further, the UE may derive the $K_{RRCint}$ key associated with the previously configured integrity algorithm, and derive the $K_{RRCenc}$ key and the $K_{UPenc}$ key associated with the previously configured ciphering algorithm. Further, the UE may configure lower layers (e.g. UE MAC) to resume integrity protection using the previously configured algorithm and the derived $K_{RRCint}$ key to all subsequent messages received and sent by the UE. Further, the UE may configure lower layers to resume ciphering and to apply the ciphering algorithm and the derived $K_{RRCenc}$ key to all subsequent messages received and sent by the UE. Further, the UE may configure lower layers to resume ciphering and to apply the ciphering algorithm and the derived $K_{UPenc}$ key derived immediately to the user data sent and received by the UE. Further, the UE may configure the lower layers to use EDT.

In step S1210, the UE may transmit a random access preamble for early data transmission to the BS. The random access preamble may indicate that the UE is attempting to transmit an early data.

In step S1220, the UE may receive a random access response including uplink grant from the BS.

In step S1230, the UE RRC may transmit information for early data transmission to UE MAC. That is, the UE RRC may submit information for early data transmission to UE MAC. For CP-EDT, the information for early data transmission may be an RRC early data request message. For UP-EDT, the information for early data transmission may be an RRC connection resume request message for EDT.

In step S1240, the UE may determine to perform early data transmission or to fallback, based on the uplink grant. For instance, if the uplink grant is not enough for the early data transmission, the UE may determine to fallback from the early data transmission to a legacy procedure. For instance, if the uplink grant is enough for the early data transmission, the UE may determine to perform the early data transmission.

If the UE determines to fallback from the early data transmission, the UE MAC may transmit information for fallback to the UE RRC. The information for fallback may be referred to as an EDT fallback indication. The information for fallback may indicate that the early data transmission is canceled. The information for fallback may indicate that the uplink grant is not enough for the early data transmission. Further, if the UE determines to fallback from the early data transmission, the UE may delete the $K_{eNB}$, $K_{RRCint}$, $K_{RRCenc}$ and $K_{UPenc}$ keys derived in step S1200. Further, the UE may re-establish RLC entities for all SRBs and DRBs. Further, the UE may suspend all SRB(s) and DRB(s) except SRB0. Further, the UE may configure lower layers (e.g. UE MAC) to suspend integrity protection and ciphering.

In step S1250, for CP-EDT, if the UE RRC receives the information for fallback from the UE MAC, the UE may transmits an RRC connection request message to the BS. That is, although the UE RRC submits the RRC early data request message to the UE MAC in step S1230, the UE may initiate transmission of the RRC connection request message. For this, after the UE RRC receives the information for fallback from the UE MAC, the UE RRC may submit the RRC connection request message to the UE MAC.

In step S1250, for UP-EDT, if the UE RRC receives the information for fallback from the UE MAC, the UE may transmits a legacy RRC connection resume request message to the BS. That is, although the UE RRC submits the RRC connection resume request message for EDT to the UE MAC in step S1230, the UE may initiate transmission of the RRC connection resume request message to the BS. For this, after the UE RRC receives the information for fallback from the UE MAC, the UE RRC may submit the legacy RRC connection resume request message to the UE MAC.

Alternatively, if the UE determines to perform the early data transmission, the UE may perform the early data transmission based on the RRC early data request message or the RRC connection resume request message for EDT.

According to an embodiment of the present invention, the UE initiating early data transmission can fallback from the initiating early data transmission procedure to the legacy procedure.

Figure 13:
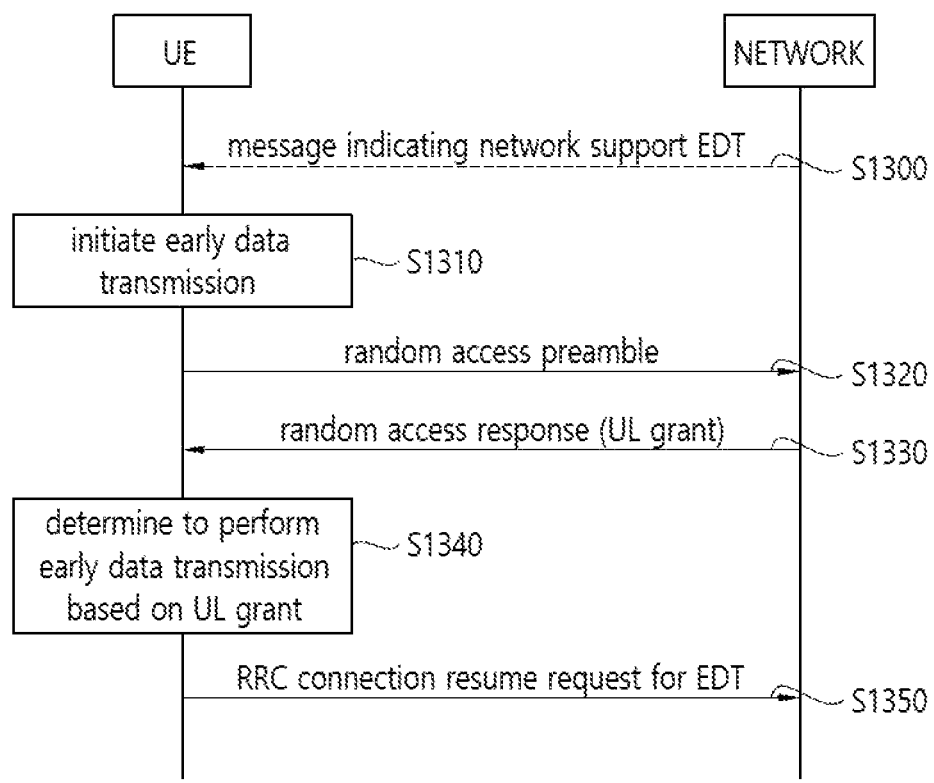
FIG. 13 shows a procedure for early data transmission according to an embodiment of the present invention.

FIG. 13 shows a procedure for early data transmission according to an embodiment of the present invention.

Referring to FIG. 13, in step S1300, the UE may receive broadcast message indicating that a network supports early data transmission, from the network. Or, the UE may receive an indication that the network supports early data transmission. Then, an upper layer (e.g. UE NAS) may indicate that the transmission is suitable for early data transmission.

In step S1310, the UE may initiate early data transmission. For instance, the UE may initiate early data transmission when at least one of the following conditions are fulfilled:

For CP-EDT, the upper layers (e.g. NAS layer) request establishment of an RRC connection, the UE supports CP-EDT, and system information block includes cp-EDT.

For UP-EDT, the upper layers (e.g. NAS layer) request resumption of an RRC connection, the UE supports UP-EDT, system information block includes up-EDT, and the UE has a stored value of the next hop chaining count provided in the RRC connection release message with suspend indication during the preceding suspend procedure. The next hop chaining count may be used to update a security key (e.g. $K_{eNB}$ key).

The establishment or resumption request is for mobile originating calls and the establishment cause is MO data or MO exception data or delay tolerant access.

System information block includes edt-Parameters.

The size of the resulting MAC PDU including the total UL data is expected to be smaller than or equal to the TBS signalled in edt-TB .

When the UE initiates early data transmission, the UE RRC may inform the UE MAC that the UE triggers the early data transmission procedure. The UE MAC may receive a data size for a message 3 as well when the UE MAC receives early data indication from the UE RRC.

In step S1320, the UE may transmit a message 1 (e.g. random access preamble) indicating that the UE is attempting to transmit early data.

In step S1330, the UE may receive a message 2 (e.g. random access response including uplink grant) from the network.

In step S1340, upon reception of the message 2, the UE may determine to perform early data transmission or to fallback based on the uplink grant. The UE MAC may inform the UE RRC whether or not the uplink grant is big enough for early data transmission. That is, if the uplink grant is not enough for early data transmission, the UE may determine to fallback based on the uplink grant. Thus, the UE MAC may inform the UE RRC about information for fallback.

On the other hand, if the uplink grant is enough for early data transmission, the UE may determine to perform early data transmission based on the uplink grant. If the UE determines to perform early data transmission, the UE may restore the PDCP state and re-establish PDCP entities for all SRBs and all DRBs. Further, the UE may resume all SRBs and all DRBs, and derive the $K_{eNB}$ key based on the KASME key to which the current $K_{eNB}$ is associated, using the stored value of the next hop chaining count received in the RRC connection release message in the preceding connection. Further, the UE may derive the $K_{RRCint}$ key associated with the previously configured integrity algorithm, and derive the $K_{RRCenc}$ key and the $K_{UPenc}$ key associated with the previously configured ciphering algorithm. Further, the UE may configure lower layers (e.g. UE MAC) to resume integrity protection using the previously configured algorithm and the derived $K_{RRCint}$ key to all subsequent messages received and sent by the UE. Further, the UE may configure lower layers to resume ciphering and to apply the ciphering algorithm and the derived $K_{RRCenc}$ key to all subsequent messages received and sent by the UE. Further, the UE may configure lower layers to resume ciphering and to apply the ciphering algorithm and the derived $K_{UPenc}$ key derived immediately to the user data sent and received by the UE. Further, the UE may configure the lower layers to use EDT.

In step S1350, if the UE determines to perform early data transmission based on the uplink grant, the UE may transmit user data in a message 3. For instance, the UE may transmit RRC connection resume request message for EDT including uplink user data to the network. For this, the UE RRC may submit the message 3 to the UE MAC.

In case that the UE resumes radio bearers and derives security contexts before checking whether the uplink grant is enough for early data transmission, the UE may suspend the radio bearers and delete security contexts when the uplink grant is not enough for early data transmission. It is unnecessary procedures to resume/suspend radio bearers and derive/delete security contexts.

However, according to an embodiment of the present invention, the UE initiating early data transmission can resume radio bearers and derive security contexts after checking that the uplink grant is enough for early data transmission. That is, if the uplink grant is not enough for early data transmission, the UE initiating early data transmission cannot resume radio bearers and derive security contexts. According to an embodiment of the present invention, it is possible to prevent the UE from resuming/suspending radio bearers and deriving/deleting security contexts unnecessarily.

Figure 14:
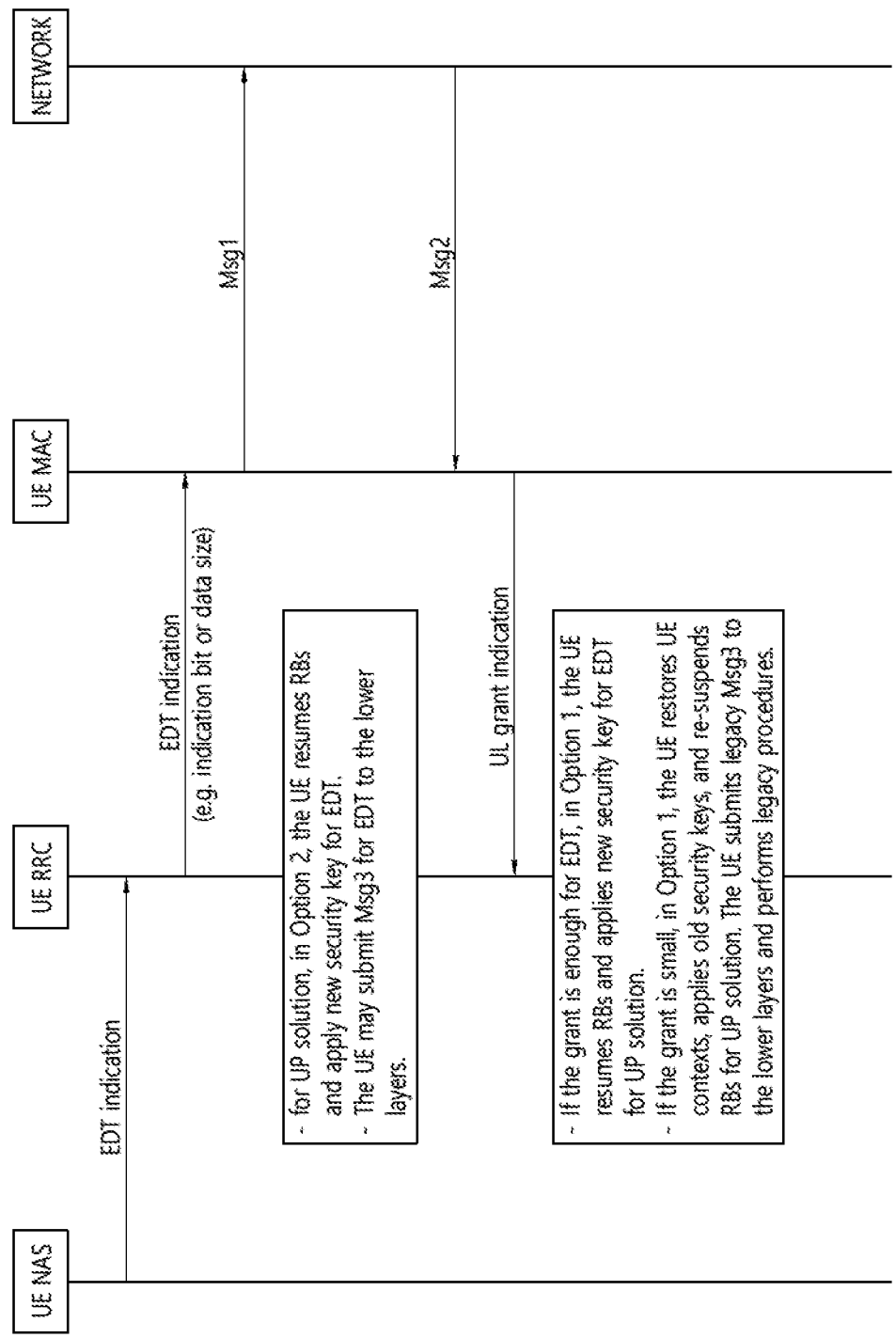
FIG. 14 shows a procedure for early data transmission according to an embodiment of the present invention.

FIG. 14 shows a procedure for early data transmission according to an embodiment of the present invention.

Referring to FIG. 14, after the UE initiates the early data transmission procedure, the UE may not continue the early data transmission procedure if conditions for EDT such as the enough uplink grant are not satisfied and need to fallback to the legacy procedure. The UE may decide when the UE context is updated or restored for early data transmission or legacy procedures based on the uplink grant received from the network and interaction from other layers.

The UE may update security contexts right after transmission of the message 1. Alternatively, the UE may update security contexts after checking whether or not the uplink grant is enough for early data transmission. That is, the UE could apply two possible solutions to decide when the UE applies early data transmission parameters for transmission and whether or not the UE restores UE context if the uplink grant is small for early data transmission.

(1) Option 1: the UE does not apply parameters for early data transmission until it verifies the uplink grant is enough for early data transmission.

For user plane (UP) solution, the UE RRC may inform that the early data transmission procedure has started to the UE MAC. Upon reception of the message 2, the UE MAC may indicate whether or not the uplink grant is enough for early data transmission to the UE RRC.

If the uplink grant is enough for early data transmission, the UE RRC may restore stored UE AS context, resume radio bearers using previously received resume ID or DRB ID(s), and update security context for the early data transmission procedure. The UE RRC may submit the RRC connection resume request for EDT to the UE MAC and perform the early data transmission procedure.

If the uplink grant is small, the UE RRC may perform legacy procedures. That is, the UE RRC may submit the legacy RRC connection resume request to the UE MAC and perform legacy data transmission procedure.

For control plane (CP) solution, the UE RRC may inform that the early data transmission procedure has started to the UE MAC. The UE RRC may submit a message 3 for early data transmission to the UE MAC at this point. Upon reception of a message 2, the UE MAC may inform whether or not the uplink grant is enough for early data transmission to the UE RRC.

If the uplink grant is small for early data transmission, the UE RRC may submit the legacy RRC connection request to the UE MAC. Otherwise, the UE RRC may submit a message 3 for early data transmission unless it has not submitted to the UE MAC before.

(2) Option 2: the UE applies early data transmission parameters after sending the message 1. If the uplink grant is small for early data transmission, it restores the contexts.

For user plane (UP) solution, after sending a message 1, the UE RRC may restore stored UE AS context, resume radio bearers using previously received resume ID or DRB ID(s). The UE may update security contexts for the early data transmission procedure. The UE RRC may submit the RRC connection resume request for the early data transmission procedure to the UE MAC.

Upon reception of a message 2, the UE MAC may inform whether or not the uplink grant is enough for early data transmission. If the uplink grant is small, the UE RRC may submit the legacy RRC connection resume request to the UE MAC. Otherwise, the UE may continue the early data transmission procedure. If the UE RRC has not submitted the RRC connection resume request for the early data transmission procedure in advance, the UE RRC may submit the RRC connection resume request for the early data transmission procedure at this point.

For control plane (CP) solution, the UE RRC may inform that the early data transmission procedure has started and submit a message 3 for early data transmission to the UE MAC. Upon reception a message 2, the UE MAC may inform whether or not the uplink grant is small for early data transmission to the UE RRC. When the uplink grant is enough for early data transmission, the UE may continue the early data transmission procedure without internal interaction. If the uplink grant is small for early data transmission, the UE RRC submit legacy RRC connection request to the UE MAC.

For the option 1, the UE RRC may decide whether or not the UE transmits early data to the network after checking all conditions such as the UL grant. According to the option 1, it is possible to prevent the UE from resuming/suspending radio bearers and deriving/deleting security contexts unnecessarily.

For the option 2, the UE may restore all UE contexts updated for EDT if it has been updated during the early data transmission procedure. However, for user plane solution, restoration of UE context including security key for legacy procedures and re-suspending radio bearers may be complex.

Figure 15:
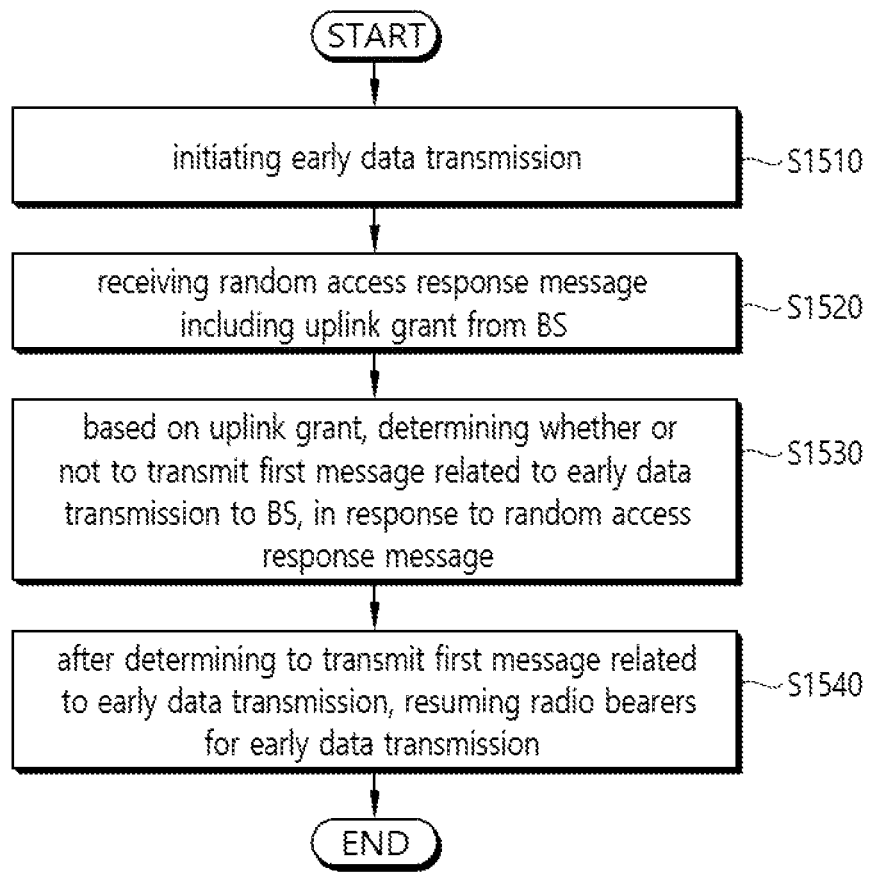
FIG. 15 shows a method for performing an early data transmission by a UE according to an embodiment of the present invention.

FIG. 15 shows a method for performing an early data transmission by a UE according to an embodiment of the present invention. The present invention described above for UE side may be applied to this embodiment.

Referring to FIG. 15, in step S1510, the UE may initiate early data transmission.

In step S1520, the UE may receive a random access response message including an uplink grant, from a base station (BS).

In step S1530, based on the uplink grant, the UE may determine whether or not to transmit a first message related to the early data transmission to the BS, in response to the random access response message. When the uplink grant is enough for the early data transmission, the UE may determine to transmit the first message related to the early data transmission to the BS. The first message related to the early data transmission may include uplink data. When the uplink grant is not enough for the early data transmission, the UE may determine to transmit a second message not related to the early data transmission to the BS, in response to the random access response message. The second message not related to the early data transmission may include no uplink data.

In step S1540, after determining to transmit the first message related to the early data transmission, the UE may resume radio bearers for the early data transmission. The radio bearers for the early data transmission may be not resumed before receiving the uplink grant.

Further, after determining to transmit the first message related to the early data transmission, the UE may derive security contexts for the early data transmission. The security contexts may include at least one of $K_{eNB}$ key, $K_{RRCint}$ key, $K_{RRCene}$ key and/or $K_{UPenc}$ key.

Further, after determining to transmit the first message related to the early data transmission, the UE may restore UE AS contexts stored in the UE.

Further, after determining to transmit the first message related to the early data transmission, the UE may resume integrity protection and ciphering.

Further, the UE may transmit the first message related to the early data transmission to the BS, in response to the random access response message.

When the UE determines to transmit the second message not related to the early data transmission, the radio bearers for the early data transmission may be not resumed. When the UE determines to transmit the second message not related to the early data transmission, security contexts for the early data transmission may be not derived.

Figure 16:
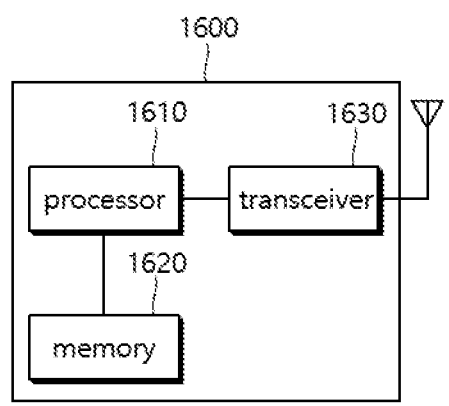
FIG. 16 shows a UE to implement an embodiment of the present invention.

FIG. 16 shows a UE to implement an embodiment of the present invention. The present invention described above for UE side may be applied to this embodiment.

A UE 1600 includes a processor 1610, a memory 1620 and a transceiver 1630. The processor 1610 may be configured to implement proposed functions, procedures and/or methods described in this description. Layers of the radio interface protocol may be implemented in the processor 1610.

Specifically, the processor 1610 may initiate early data transmission.

Further, the processor 1610 may control the transceiver 1630 to receive a random access response message including an uplink grant, from a transceiver 1830.

Further, based on the uplink grant, the processor 1610 may determine whether or not to transmit a first message related to the early data transmission to the BS, in response to the random access response message. When the uplink grant is enough for the early data transmission, the processor 1610 may determine to transmit the first message related to the early data transmission to the BS. The first message related to the early data transmission may include uplink data. When the uplink grant is not enough for the early data transmission, the processor 1610 may determine to transmit a second message not related to the early data transmission to the BS, in response to the random access response message. The second message not related to the early data transmission may include no uplink data.

Further, after determining to transmit the first message related to the early data transmission, the processor 1610 may resume radio bearers for the early data transmission. The radio bearers for the early data transmission may be not resumed before receiving the uplink grant.

Further, after determining to transmit the first message related to the early data transmission, the processor 1610 may derive security contexts for the early data transmission. The security contexts may include at least one of $K_{eNB}$ key, $K_{RRCint}$ key, $K_{RRCenc}$ key and/or $K_{UPenc}$ key.

Further, after determining to transmit the first message related to the early data transmission, the processor 1610 may restore UE AS contexts stored in the UE.

Further, after determining to transmit the first message related to the early data transmission, the processor 1610 may resume integrity protection and ciphering.

Further, the processor 1610 may control the transceiver 1630 to transmit the first message related to the early data transmission to the BS, in response to the random access response message.

When the processor 1610 determines to transmit the second message not related to the early data transmission, the radio bearers for the early data transmission may be not resumed. When the processor 1610 determines to transmit the second message not related to the early data transmission, security contexts for the early data transmission may be not derived.

The memory 1620 is operatively coupled with the processor 1610 and stores a variety of information to operate the processor 1610. The transceiver 1630 is operatively coupled with the processor 1610, and transmits and/or receives a radio signal.

Figure 17:
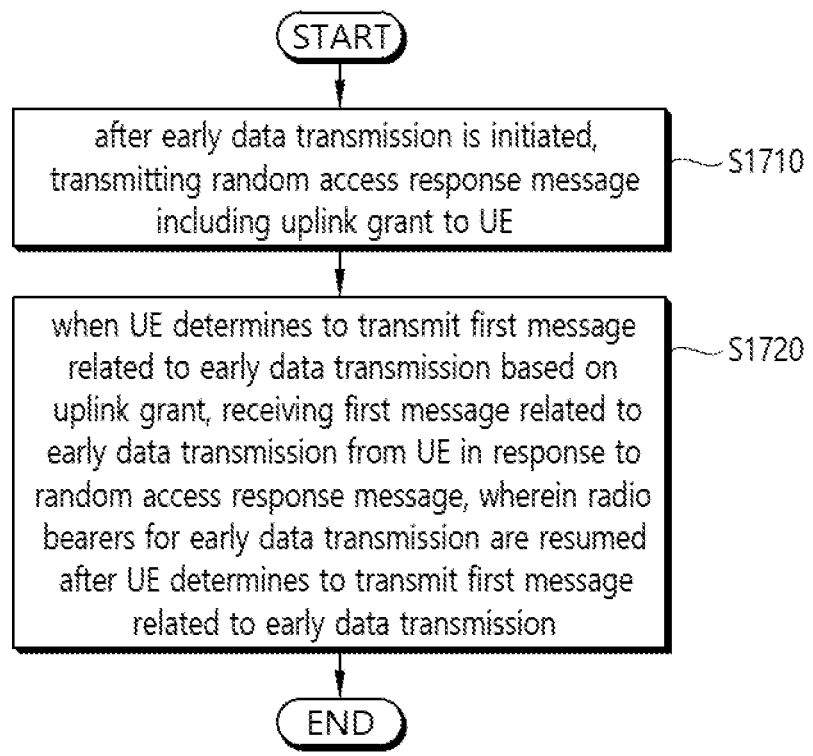
FIG. 17 shows a method for performing an early data transmission by a BS according to an embodiment of the present invention.

FIG. 17 shows a method for performing an early data transmission by a BS according to an embodiment of the present invention. The present invention described above for BS side may be applied to this embodiment.

Referring to FIG. 17, in step S1710, after early data transmission is initiated, the BS may transmit a random access response message including an uplink grant, to the UE. In step S1720, when the UE determines to transmit a first message related to the early data transmission based on the uplink grant, the BS may receive the first message related to the early data transmission from the UE in response to the random access response message. Radio bearers for the early data transmission may be resumed after the UE determines to transmit the first message related to the early data transmission.

Figure 18:
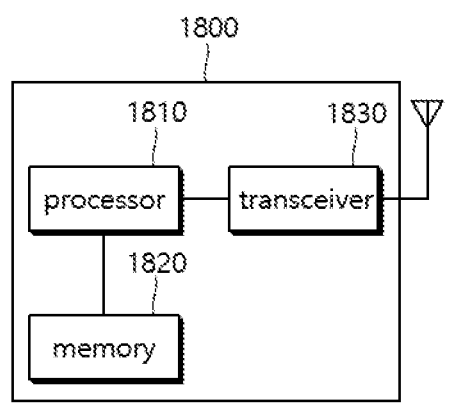
FIG. 18 shows a BS to implement an embodiment of the present invention.

FIG. 18 shows a BS to implement an embodiment of the present invention. The present invention described above for BS side may be applied to this embodiment.

A BS 1800 includes a processor 1810, a memory 1820 and a transceiver 1830. The processor 1810 may be configured to implement proposed functions, procedures and/or methods described in this description. Layers of the radio interface protocol may be implemented in the processor 1810.

Specifically, after early data transmission is initiated, the processor 1810 may control the transceiver 1830 to transmit a random access response message including an uplink grant, to the transceiver 1630. In step S1720, when the processor 1610 determines to transmit a first message related to the early data transmission based on the uplink grant, the processor 1810 may control the transceiver 1830 to receive the first message related to the early data transmission from the transceiver 1630 in response to the random access response message. Radio bearers for the early data transmission may be resumed after the processor 1610 determines to transmit the first message related to the early data transmission.

The memory 1820 is operatively coupled with the processor 1810 and stores a variety of information to operate the processor 1810. The transceiver 1830 is operatively coupled with the processor 1810, and transmits and/or receives a radio signal.

The processor 1610, 1810 may include an application-specific integrated circuit (ASIC), a separate chipset, a logic circuit, and/or a data processing unit. The memory 1620, 1820 may include a read-only memory (ROM), a random access memory (RAM), a flash memory, a memory card, a storage medium, and/or other equivalent storage devices. The transceiver 1630, 1830 may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor 1610, 1810. The memory 1620, 1820 may be located inside or outside the processor 1610, 1810, and may be coupled to the processor 1610, 1810 by using various well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for transmitting a message by a user equipment (UE) in a wireless communication system, the method comprising:

receiving a broadcast message including information that a network supports early data transmission;

initiating the early data transmission;

receiving a random access response message including an uplink grant, from a base station (BS);

based on (i) a transport block (TB) size related to the uplink grant and (ii) a TB size related to the early data transmission, determining whether or not to transmit a first message related to the early data transmission to the BS, in response to the random access response message; and after determining to transmit the first message related to the early data transmission, deriving security contexts for the early data transmission and resuming all signaling radio bearers (SRBs) and all data radio bearers (DRBs) for the early data transmission, wherein the security contexts include a $K_{eNB}$ key, a $K_{RRCint}$ key, a $K_{RRCenc}$ key, and a $K_{UPenc}$ key, wherein the $K_{eNB}$ key is derived based on a $K_{ASME}$ key to which a current $K_{eNB}$ is related, using a stored value of a next hop chaining count received in a radio resource control (RRC) connection release message in a preceding connection, and wherein the $K_{RRCint}$ key is related with a previously configured integrity algorithm, and the $K_{RRCenc}$ key and the $K_{UPenc}$ key are related with a previously configured ciphering algorithm.

2. The method of claim 1, wherein the all SRBs and the all DRBs for the early data transmission are not resumed before receiving the uplink grant.

3. The method of claim 1, wherein based on the uplink grant being sufficient for the early data transmission, it is determined to transmit the first message related to the early data transmission to the BS.

4. The method of claim 1, wherein the first message related to the early data transmission includes uplink data.

5. The method of claim 1, further comprising:
after determining to transmit the first message related to the early data transmission, restoring UE AS contexts stored in the UE.

6. The method of claim 1, further comprising:
after determining to transmit the first message related to the early data transmission, resuming integrity protection and ciphering.

7. The method of claim 6, wherein a medium access control (MAC) layer of the UE is configured to resume ciphering and to apply the ciphering algorithm and the derived $K_{UPenc}$ key derived immediately to user data transmitted and received by the UE.

8. The method of claim 1, further comprising:
transmitting the first message related to the early data transmission to the BS, in response to the random access response message.

9. The method of claim 1, wherein based on the uplink grant not being sufficient for the early data transmission, it is determined to transmit a second message not related to the early data transmission to the BS, in response to the random access response message.

10. The method of claim 9, wherein the second message not related to the early data transmission includes no uplink data.

11. The method of claim 10, based on a determination to transmit the second message not related to the early data transmission, the all SRBs and the all DRBs for the early data transmission are not resumed.

12. The method of claim 9, based on a determination to transmit the second message not related to the early data transmission, security contexts for the early data transmission are not derived.

13. The method of claim 1, wherein a medium access control (MAC) layer of the UE is configured to resume integrity protection using a previously configured algorithm and the derived $K_{RRCint}$ key to all subsequent messages received and transmitted by the UE and
wherein the MAC layer of the UE is configured to resume ciphering and to apply the ciphering algorithm and the derived $K_{RRCenc}$ key to all subsequent messages received and transmitted by the UE.

14. A method for receiving a message by a base station (BS) in a wireless communication system, the method comprising:

transmitting, to a user equipment (UE), a broadcast message including information that a network supports early data transmission;

after the early data transmission is initiated, transmitting a random access response message including an uplink grant, to the UE; and based on a determination by the UE to transmit a first message related to the early data transmission based on (i) a transport block (TB) size related to the uplink grant and (ii) a TB size related to the early data transmission, receiving the first message related to the early data transmission from the UE in response to the random access response message, wherein all signaling radio bearers (SRBs) and all data radio bearers (DRBs) for the early data transmission are resumed and security contexts for the early data transmission are derived after the UE determines to transmit the first message related to the early data transmission, wherein the security contexts include a $K_{eNB}$ key, a $K_{RRCint}$ key, a $K_{RRCenc}$ key, and a $K_{UPenc}$ key, wherein the $K_{eNB}$ key is derived based on a $K_{ASME}$ key to which a current $K_{eNB}$ is related, using a stored value of a next hop chaining count in a radio resource control (RRC) connection release message in a preceding connection, and wherein the $K_{RRCint}$ key is related with a previously configured integrity algorithm, and the $K_{RRCenc}$ key and the $K_{UPenc}$ key are related with a previously configured ciphering algorithm.

15. A user equipment (UE) configured to transmit message in a wireless communication, the UE comprising:
a transceiver;
at least one processor; and
at least one computer memory operably connectable to the at least one processor and storing instructions that, when executed, cause the at least one processor to perform operations comprising:

receiving a broadcast message including information that a network supports early data transmission;

initiating the early data transmission;

receiving a random access response message including an uplink grant, from a base station (BS);

based on (i) a transport block (TB) size related to the uplink grant and (ii) a TB size related to the early data transmission, determining whether or not to transmit a first message related to the early data transmission to the BS, in response to the random access response message; and after determining to transmit the first message related to the early data transmission, deriving security contexts for the early data transmission and resuming all signaling radio bearers (SRBs) and all data radio bearers (DRBs) for the early data transmission, wherein the security contexts include a $K_{eNB}$ key, a $K_{RRCint}$ key, a $K_{RRCenc}$ key, and a $K_{UPenc}$ key, wherein the $K_{eNB}$ key is derived based on a $K_{ASME}$ key to which a current $K_{eNB}$ is related, using a stored value of a next hop chaining count received in a radio resource control (RRC) connection release message in a preceding connection, and wherein the $K_{RRCint}$ key is related with a previously configured integrity algorithm, and the $K_{RRCenc}$ key and the $K_{UPenc}$ key are related with a previously configured ciphering algorithm.

* * * * *